United States Patent
Sun et al.

(10) Patent No.: US 9,084,288 B2
(45) Date of Patent: Jul. 14, 2015

(54) DUAL-SIM WIRELESS COMMUNICATIONS DEVICE AND METHOD FOR MITIGATING RECEIVER DESENSE IN DUAL-ACTIVE OPERATION

(71) Applicant: QUALCOMM Incorporated, San Diego, CA (US)

(72) Inventors: Jing Sun, San Diego, CA (US); Amit Mahajan, San Diego, CA (US); Rashid Ahmed Akbar Attar, San Diego, CA (US); Jun Hu, San Diego, CA (US); Huang Lou, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 167 days.

(21) Appl. No.: 13/830,301

(22) Filed: Mar. 14, 2013

(65) Prior Publication Data

US 2014/0274201 A1    Sep. 18, 2014

(51) Int. Cl.
*H04M 1/00* (2006.01)
*H04W 88/06* (2009.01)
*H04B 1/525* (2015.01)
*H04B 1/3827* (2015.01)

(52) U.S. Cl.
CPC .............. *H04W 88/06* (2013.01); *H04B 1/525* (2013.01); *H04B 2001/3861* (2013.01)

(58) Field of Classification Search
CPC .................................................. H04W 88/06
USPC .......... 455/552.1, 452.2, 404.1, 435.1, 426.1, 455/435.2, 436; 370/331, 315, 328, 216, 370/338, 252, 235
See application file for complete search history.

(56) References Cited

U.S. PATENT DOCUMENTS

| | | |
|---|---|---|
| 7,899,106 B2 | 3/2011 | Camp et al. |
| 7,974,228 B2 * | 7/2011 | Bosch et al. ............. 370/315 |
| 8,238,968 B1 | 8/2012 | Frydman |
| 8,248,519 B2 | 8/2012 | Liao |
| 2003/0058822 A1 | 3/2003 | Jou |
| 2004/0038658 A1 | 2/2004 | Gurelli et al. |
| 2004/0151122 A1 | 8/2004 | Lau et al. |

(Continued)

FOREIGN PATENT DOCUMENTS

EP          1484933 A1    12/2004
WO    WO-2011113317 A1    9/2011

(Continued)

OTHER PUBLICATIONS

Partial International Search Report—PCT/US2014/024951—ISA/EPO—Aug. 19, 2014.

(Continued)

*Primary Examiner* — Kiet Doan
(74) *Attorney, Agent, or Firm* — Loza & Loza LLP

(57) ABSTRACT

Aspects of the disclosure provide for an access terminal configured to enable communication with two or more wireless communications networks simultaneously. According to some aspects of the disclosure, an access terminal (e.g., dual-SIM access terminal) can be active simultaneously on both networks with reduced interference between transmission and reception. A number of different techniques for mitigating desense on a victim's Rx are illustrated in this disclosure with a GSM aggressor and an EV-DO victim as non-limiting examples. Other aspects, embodiments, and features are also claimed and described.

6 Claims, 15 Drawing Sheets

(56) References Cited

U.S. PATENT DOCUMENTS

| | | |
|---|---|---|
| 2007/0064835 A1 | 3/2007 | Auranen |
| 2007/0081500 A1 | 4/2007 | Jung et al. |
| 2007/0165754 A1 | 7/2007 | Kiukkonen et al. |
| 2008/0010430 A1 | 1/2008 | Altahan et al. |
| 2009/0023404 A1 | 1/2009 | Leinonen et al. |
| 2009/0141683 A1* | 6/2009 | Grinshpun et al. ............ 370/331 |
| 2010/0265228 A1 | 10/2010 | Kimura et al. |
| 2010/0309862 A1 | 12/2010 | Fang et al. |
| 2011/0081864 A1 | 4/2011 | Srinivas et al. |
| 2011/0255516 A1 | 10/2011 | Pawar et al. |
| 2012/0164948 A1 | 6/2012 | Narasimha et al. |
| 2012/0184327 A1 | 7/2012 | Love et al. |
| 2013/0012135 A1* | 1/2013 | Ruohonen et al. ............ 455/63.1 |
| 2013/0044621 A1 | 2/2013 | Jung et al. |
| 2013/0283257 A1* | 10/2013 | Sen et al. ...................... 717/173 |

FOREIGN PATENT DOCUMENTS

| | | |
|---|---|---|
| WO | 2012099505 A1 | 7/2012 |
| WO | 2012103554 A2 | 8/2012 |
| WO | WO-2014121305 A2 | 8/2014 |

OTHER PUBLICATIONS

International Search Report and Written Opinion—PCT/US2014/024951—ISA/EPO—Dec. 15, 2014.

International Search Report and Written Opinion—PCT/US2014/024951—ISA/EPO—Nov. 4, 2014.

\* cited by examiner

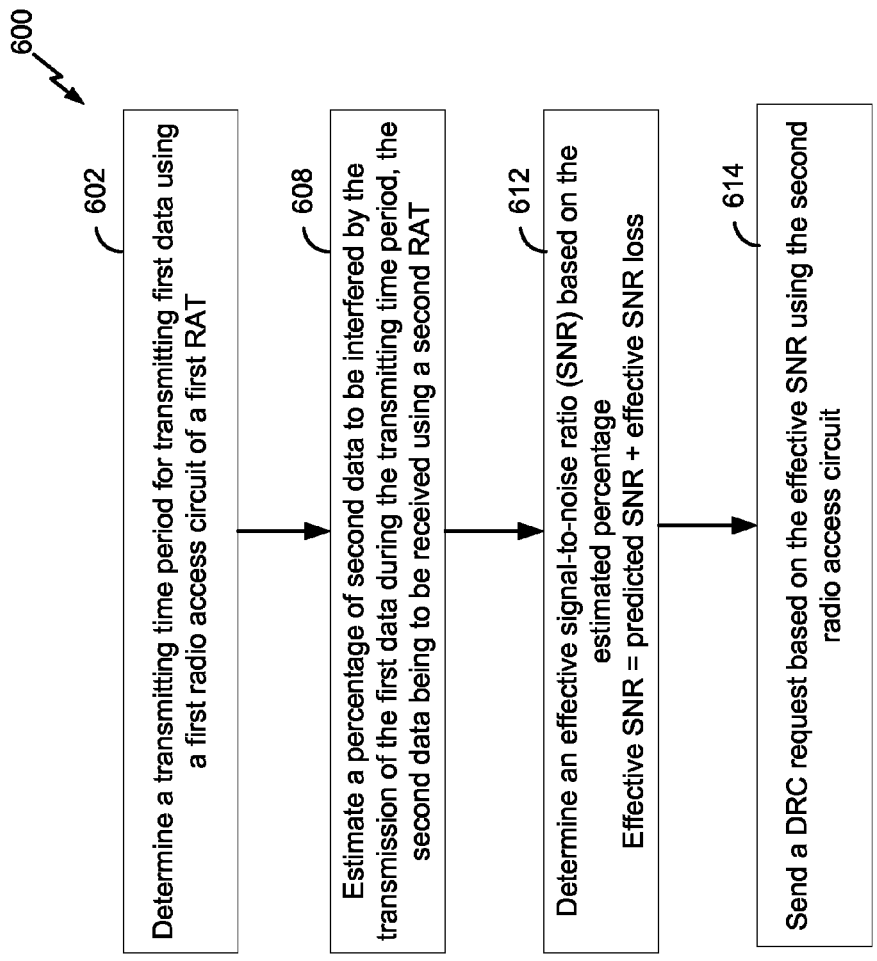
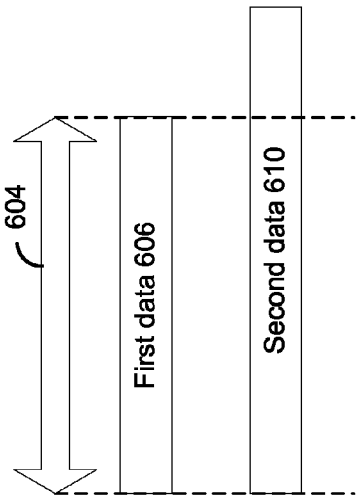
FIG. 6

DUAL-SIM WIRELESS COMMUNICATIONS DEVICE AND METHOD FOR MITIGATING RECEIVER DESENSE IN DUAL-ACTIVE OPERATION

TECHNICAL FIELD

The technology discussed below relates generally to wireless communications, and more particularly, to a dual-SIM wireless communications device capable of operating in dual-active mode and related methods for operating the same.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is a global system for mobile (GSM) network, which utilizes a GSM air interface. Enhanced GPRS is an extension of GSM technology providing increased data rates beyond those available in second-generation GSM technology. EGPRS is also known in the field as Enhanced Data rates for GSM Evolution (EDGE), and IMT Single Carrier.

Another example of wireless communication networks is CDMA2000 standard. Enhanced Voice-Data Optimized (EV-DO) is an evolution of the CDMA2000 standard that can support high data rates and can be deployed alongside voice services. EV-DO uses multiplexing techniques including code division multiple access (CDMA) as well as time division multiplexing (TDM) to increase both individual users' throughput and the overall system throughput. EV-DO is standardized by 3rd Generation Partnership Project 2 (3GPP2) as part of the CDMA2000 family of standards.

Recently, some wireless mobile equipment (also referred to as, e.g., mobile station, user equipment, etc.) have the capability to operate in multiple networks. Examples of such equipment include an access terminal equipped with dual subscriber identification modules (dual-SIM). Some dual-SIM access terminals can operate simultaneously on two different radio networks. One such device is referred to as a dual-SIM dual-active (DSDA) device. A DSDA device can be connected to two wireless communications networks (e.g., GSM and EV-DO) at the same time. However, due to the proximity of the RF transmitter and receiver of such device, transmission on one network may cause interference on the receiver's reception on another network when both transmission and reception occur at the same time.

BRIEF SUMMARY OF SOME SAMPLE EMBODIMENTS

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of mitigating receiver desense during dual-active mode at a dual-SIM access terminal. The method includes, during a transmitting time period, transmitting first data using a first radio access circuit of a first radio access technology (RAT); during at least a portion of the transmitting time period, receiving second data using a second radio access circuit of a second RAT; and modifying a preamble detection process of the second data at the second radio access circuit based on the transmitting time period.

Another aspect of the disclosure provides a dual-SIM access terminal capable of mitigating receiver desense during dual-active mode. The dual-SIM includes: a first radio access circuit of a first radio access technology (RAT); a second radio access circuit of a second RAT; during a transmitting time period, means for transmitting first data using the first radio access circuit; during at least a portion of the transmitting time period, means for receiving second data using the second radio access circuit; and means for selectively modifying a preamble detection process at the second radio access circuit based on the transmitting time period.

Another aspect of the disclosure provides a computer program product including a computer-readable storage medium. The computer-readable storage medium includes code for causing a dual-SIM access terminal capable of mitigating receiver desense during dual-active mode, to: during a transmitting time period, transmit first data using a first radio access circuit of a first radio access technology (RAT); during at least a portion of the transmitting time period, receive second data using a second radio access circuit of a second RAT; and selectively modify a preamble detection process at the second radio access circuit based on the transmitting time period.

Another aspect of the disclosure provides a dual-SIM access terminal capable of mitigating receiver desense during dual-active mode. The dual-SIM access terminal includes: at least one processor; a first radio access circuit of a first radio access technology (RAT) coupled to the at least one processor; a second radio access circuit of a second RAT coupled to the at least one processor; a memory coupled to the at least one processor. The at least one processor is configured to: during a transmitting time period, transmit first data using the first radio access circuit; during at least a portion of the transmitting time period, receive second data using the second radio access circuit; and selectively modify a preamble detection process at the second radio access circuit based on the transmitting time period.

Another aspect of the disclosure provides a method of mitigating receiver desense at a dual-SIM access terminal during dual-active mode. The method includes: determining a transmitting time period for transmitting first data using a first radio access circuit of a first radio access technology (RAT); estimating a percentage of second data to be interfered by the transmission of the first data during the transmitting time period, the second data being to be received using a second radio access circuit of a second RAT; determining an effective signal-to-noise ratio (SNR) based on the estimated percentage; and sending a DRC request based on the effective SNR using the second radio access circuit.

Another aspect of the disclosure provides a dual-SIM access terminal capable of mitigating receiver desense during dual-active mode. The dual-SIM access terminal includes: a first radio access circuit of a first radio access technology (RAT); a second radio access circuit of a second RAT; means for determining a transmitting time period for transmitting first data using the first radio access circuit; means for estimating a percentage of second data to be interfered by the transmission of the first data during the transmitting time period, the second data being to be received using the second radio access circuit; means for determining an effective signal-to-noise ratio (SNR) based on the estimated percentage; and means for sending a date rate control (DRC) request based on the effective SNR using the second radio access circuit.

Another aspect of the disclosure provides a computer program product including a computer-readable storage medium. The computer-readable storage medium includes code for causing a dual-SIM access terminal capable of mitigating receiver desense during dual-active mode, to: determine a transmitting time period for transmitting first data using a first radio access circuit of a first radio access technology (RAT); estimate a percentage of second data to be interfered by the transmission of the first data during the transmitting time period, the second data being to be received using a second radio access circuit of a second RAT; determine an effective signal-to-noise ratio (SNR) based on the estimated percentage; and send a DRC request based on the effective SNR using the second radio access circuit.

Another aspect of the disclosure provides a dual-SIM access terminal capable of mitigating receiver desense during dual-active mode. The dual-SIM access terminal includes: at least one processor; a first radio access circuit of a first radio access technology (RAT) coupled to the at least one processor; a second radio access circuit of a second RAT coupled to the at least one processor; a memory coupled to the at least one processor. The at least one processor is configured to: determine a transmitting time period for transmitting first data using the first radio access circuit; estimate a percentage of second data to be interfered by the transmission of the first data during the transmitting time period, the second data being to be received using the second radio access circuit; determine an effective signal-to-noise ratio (SNR) based on the estimated percentage; and send a DRC request based on the effective SNR using the second radio access circuit.

Another aspect of the disclosure provides a method of mitigating receiver desense at a dual-SIM access terminal during dual-active mode. The method includes: during a transmitting time period, transmitting first data using a first radio access circuit of a first radio access technology (RAT); during at least a portion of the transmitting time period, receiving second data using a second radio access circuit of a second RAT; and suspending handling of at least one corrupted forward link MAC channel at the second radio access circuit during the transmitting time period.

Another aspect of the disclosure provides a dual-SIM access terminal capable of mitigating receiver desense during dual-active mode. The dual-SIM access terminal includes: a first radio access circuit of a first radio access technology (RAT); a second radio access circuit of a second RAT; during a transmitting time period, means for transmitting first data using the first radio access circuit; during at least a portion of the transmitting time period, means for receiving second data using the second radio access circuit; and means for suspending handling of at least one corrupted forward link MAC channel at the second radio access circuit during the transmitting time period.

Another aspect of the disclosure provides a computer program product including a computer-readable storage medium. The computer-readable storage medium includes code for causing a dual-SIM access terminal capable of mitigating receiver desense during dual-active mode, to: during a transmitting time period, transmit first data using a first radio access circuit of a first radio access technology (RAT); during at least a portion of the transmitting time period, receive second data using a second radio access circuit of a second RAT; and suspend handling of at least one corrupted forward link MAC channel at the second radio access circuit during the transmitting time period.

Another aspect of the disclosure provides a dual-SIM access terminal capable of mitigating receiver desense during dual-active mode. The dual-SIM access terminal includes: at least one processor; a first radio access circuit of a first radio access technology (RAT) coupled to the at least one processor; a second radio access circuit of a second RAT coupled to the at least one processor; a memory coupled to the at least one processor. The at least one processor is configured to: during a transmitting time period, transmit first data using the first radio access circuit; during at least a portion of the transmitting time period, receive second data using the second radio access circuit; and suspend handling of at least one corrupted forward link MAC channel at the second radio access circuit during the transmitting time period.

Another aspect of the disclosure provides a method of mitigating receiver desense at a dual-SIM access terminal during dual-active mode. The method includes: during a transmitting time period, transmitting first data using a first radio access circuit of a first radio access technology (RAT); during at least a portion of the transmitting time period, receiving second data using a second radio access circuit of a second RAT; storing the second data in a memory; determining a desense value indicative of a degree of desense on the reception of the second data caused by the transmission of the first data; and selectively nulling the second data in the memory based on the desense value.

Another aspect of the disclosure provides a dual-SIM access terminal capable of mitigating receiver desense during dual-active mode. The dual-SIM access terminal includes: a first radio access circuit of a first radio access technology (RAT); a second radio access circuit of a second RAT; during a transmitting time period, means for transmitting first data using the first radio access circuit; during at least a portion of the transmitting time period, means for receiving second data using the second radio access circuit; means for storing the second data in a memory; means for determining a desense value indicative of a degree of desense on the reception of the second data caused by the transmission of the first data; and means for selectively nulling the second data in the memory based on the desense value.

Another aspect of the disclosure provides a computer program product including a computer-readable storage medium. The computer-readable storage medium includes code for causing a dual-SIM access terminal capable of mitigating receiver desense during dual-active mode, to: during a transmitting time period, transmit first data using a first radio access circuit of a first radio access technology (RAT); during at least a portion of the transmitting time period, receive second data using a second radio access circuit of a second RAT; store the second data in a memory; determine a desense value indicative of a degree of desense on the reception of the second data caused by the transmission of the first data; and selectively null the second data in the memory based on the desense value.

Another aspect of the disclosure provides a dual-SIM access terminal capable of mitigating receiver desense during dual-active mode. The dual-SIM access terminal includes: at least one processor; a first radio access circuit of a first radio access technology (RAT) coupled to the at least one processor; a second radio access circuit of a second RAT coupled to the at least one processor; a memory coupled to the at least one processor. The at least one processor is configured to: during a transmitting time period, transmit first data using the first radio access circuit; during at least a portion of the transmitting time period, receive second data using the second radio access circuit; store the second data in a memory; determine a desense value indicative of a degree of desense on the reception of the second data caused by the transmission of the first data; and selectively null the second data in the memory based on the desense value.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 6 is a diagram illustrating a Data Rate Control (DRC) requested based method for mitigating receiver desense at an access terminal according to some aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

The various concepts presented throughout this disclosure may be implemented across a broad variety of wireless communication systems, network architectures, and communication standards. Certain aspects of the discussions are described below for GSM and EV-DO protocols and systems, and related terminology may be found in much of the following description. However, those of ordinary skill in the art will recognize that one or more aspects of the present disclosure may be employed and included in one or more other wireless communication protocols and systems.

One or more aspects of the disclosure provide for an access terminal configured to enable communication with two or more wireless communications networks. The communications networks may be of the same or different radio access technologies (RAT). One example of such access terminal is a dual-SIM access terminal that can access a GSM network and an EV-DO network. GSM transmission ("aggressor") or other time division multiple access (TDMA)-type transmission is bursty in nature and can cause significant desense on EV-DO reception ("victim"). Therefore, a transmission (aggressor's Tx) on one RAT (e.g., GSM) may desense the reception (victim's Rx) on the other RAT (e.g., EV-DO) via direct (blocking) interference, harmonics, intermodulation, and electronics/power amplifier noises, etc.

When desense on the victim's Rx is significant, the victim's reception may be significantly impacted such as receiver sensitivity degradation, call quality degradation, higher rates for call drops and radio link failures, data throughput degradation, and lost of data connection. According to some aspects of the disclosure, an access terminal (e.g., dual-SIM access terminal) can be active simultaneously on both networks with reduced interference between transmission and reception. A number of different techniques for mitigating desense on a victim's Rx are illustrated in this disclosure with a GSM aggressor and an EV-DO victim as nonlimiting examples. However, the concepts disclosed herein can be applied to other suitable wireless networks, and the present invention is not limited to GSM and EV-DO.

Figure 1:
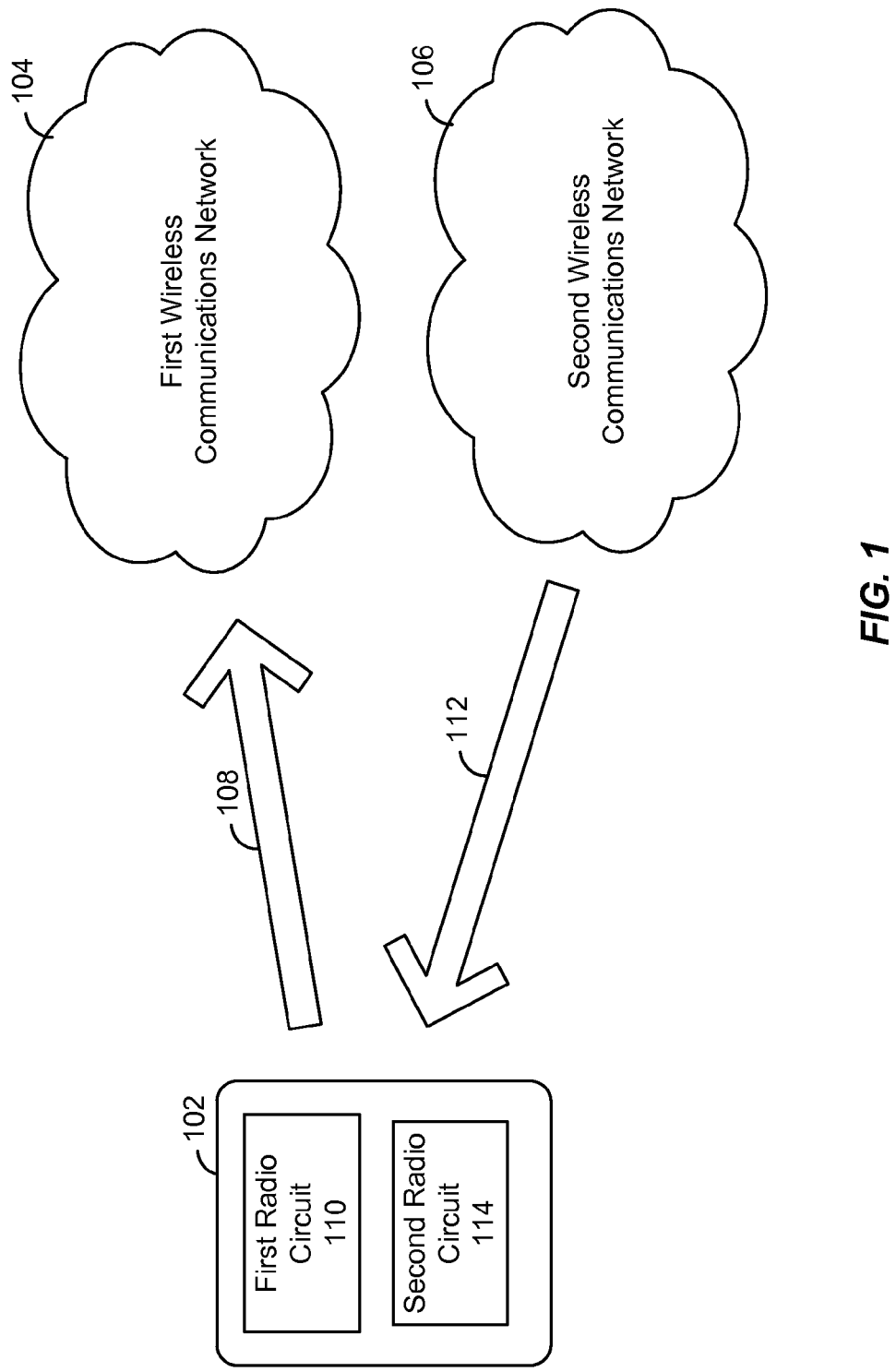
FIG. 1 is a conceptual diagram illustrating an access terminal configured to operate in a first wireless communications network and a second wireless communications network according to some aspects of the disclosure.

The various concepts presented throughout this disclosure may be implemented across a broad variety of telecommunication systems, network architectures, and communication standards. FIG. 1 is a conceptual diagram illustrating an access terminal (AT) 102 that can simultaneously operate in a first wireless communications network 104 of a first radio access technology (RAT) and a second wireless communications network 106 of a second RAT. In one aspect, the first RAT is GSM, and the second RAT is EV-DO. The first wireless communications network 104 and the second wireless communications network 106 may be associated with the same carrier or different carriers. Here, the AT 102 may be configured to be simultaneously active on both networks 104 and 106. For example, the AT 102 transmits first data 108 to the first wireless communications network 104 using a first radio access circuit 110, and receives second data 112 from the second wireless communications network 106 using a second radio access circuit 114. In one aspect, the first data 108 may be sent as a GSM transmission (aggressor's Tx), and the second data 112 may be received as an EV-DO reception (victim's Rx). Here, the GSM transmission may desense the EV-DO reception.

Within the scope of the present disclosure, a DSDA access terminal (e.g., AT 102) may be able to simultaneously access one or more wireless communications networks such as a GSM network, a UMTS network, an LTE network, a CDMA2000 network, a Wi-MAX network, or any other suitable radio access technology (RAT). Within the present disclosure, DSDA devices, multi-SIM/multiple active devices, or any device capable of being simultaneously active on two or more RATs is generally referred to as a DSDA device.

Figure 2:
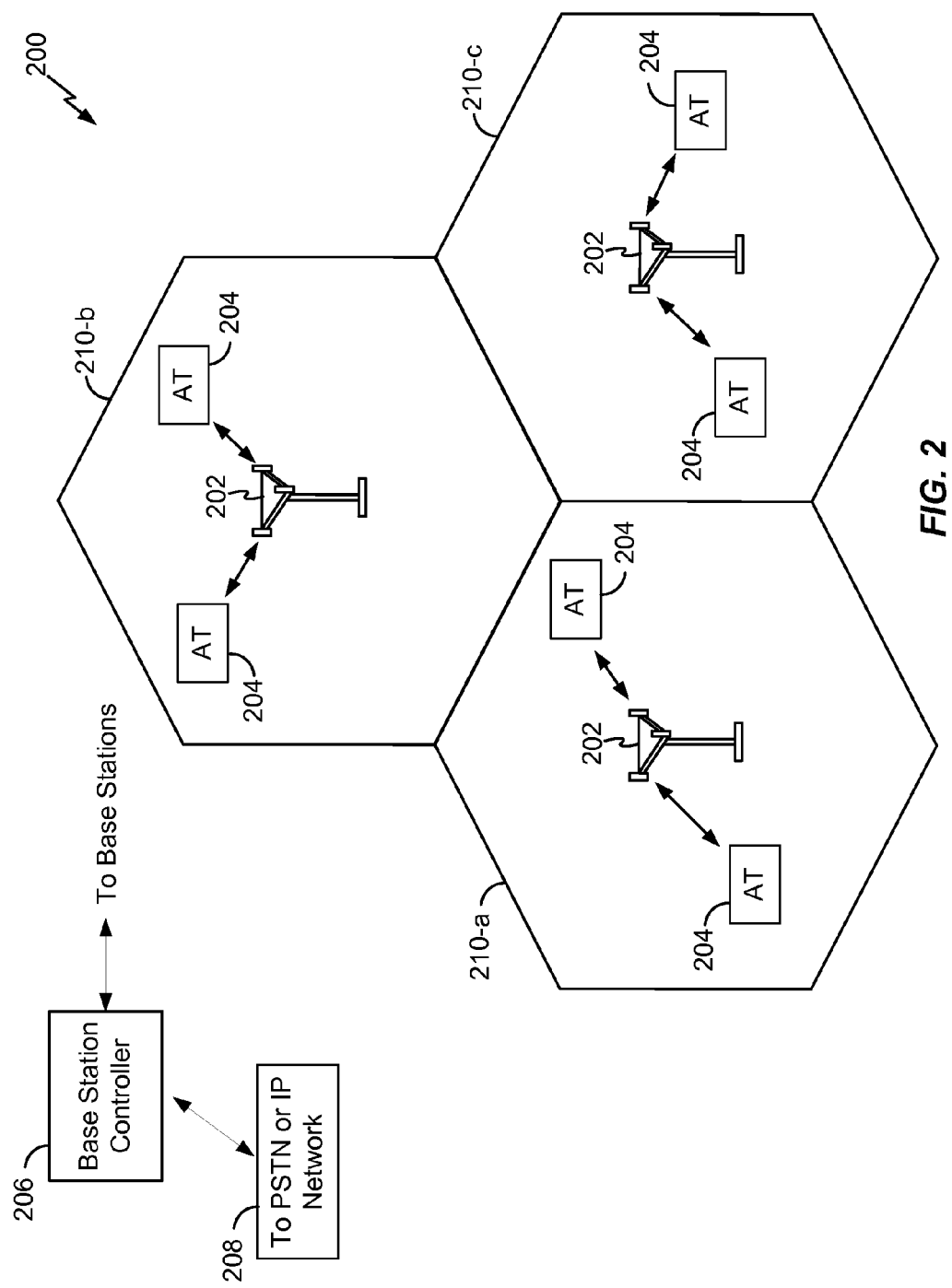
FIG. 2 is a conceptual diagram illustrating an example of an access network environment according to some aspects of the disclosure.

FIG. 2 is a conceptual diagram illustrating an example of an access network environment in which one or more aspects of the present disclosure may find application. The wireless communication system 200 generally includes one or more base stations 202, one or more access terminals 204 (e.g., AT 102), one or more base station controllers (BSC) 206, and a core network 208 providing access to a public switched telephone network (PSTN) (e.g., via a mobile switching center/visitor location register (MSC/VLR)) and/or to an IP network (e.g., via a packet data switching node (PDSN)). The system 200 may support multiple RATs (e.g., GSM and EVDO) on different carriers. While CDMA2000 terminology may be used to describe some elements of the network environment in FIG. 2, one skilled in the art will understand that the network 200 may support multiple RATs.

The base stations 202 can wirelessly communicate with the access terminals (ATs) 204 via a base station antenna. The base stations 202 may each be implemented generally as a device adapted to facilitate wireless connectivity (for one or more AT 204) to the wireless communications system 200. A base station 202 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology. In some aspects, the base stations 202 may be configured to support simultaneous GSM and EVDO operations.

The base stations 202 are configured to communicate with the access terminals 204 under the control of the base station controller 206 via one or more carriers. Each of the base stations 202 can provide communication coverage for a respective geographic area. The coverage area 210 for each base station 202 here is identified as cells 210-*a*, 210-*b*, or 210-*c*. The coverage area 210 for a base station 202 may be divided into sectors (not shown, but making up only a portion of the coverage area). In a coverage area 210 that is divided into sectors, the multiple sectors within a coverage area 210 can be formed by groups of antennas with each antenna responsible for communication with one or more access terminals 204 in a portion of the cell.

One or more access terminals 204 may be dispersed throughout the coverage areas 210, and may wirelessly communicate with one or more sectors associated with each respective base station 202. An access terminal 204 may generally include one or more devices that communicate with one or more other devices through wireless signals. Such access terminals 204 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. The access terminals 204 may include mobile terminals and/or at least substantially fixed terminals. Examples of access terminals 204 include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

Figure 3:
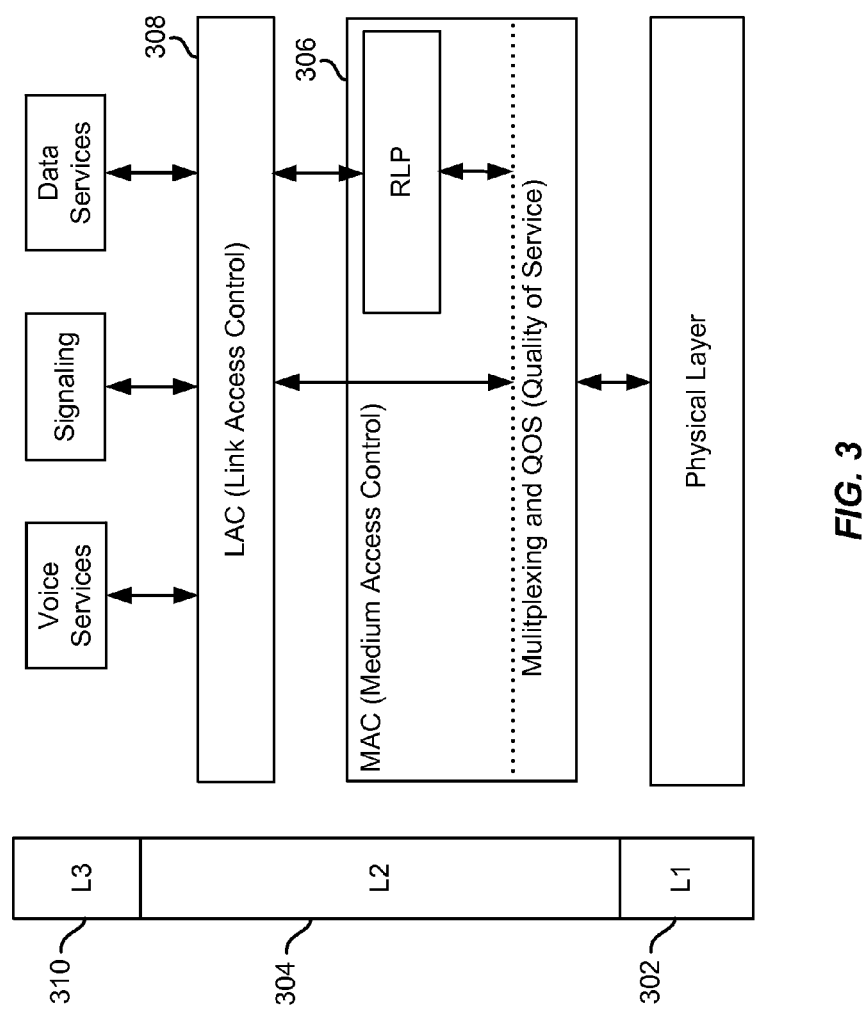
FIG. 3 is a block diagram illustrating an example of a protocol stack architecture implemented at an access terminal according to some aspects of the disclosure.

The access terminal 204, which may be the AT 102 in one aspect, may be adapted to employ a protocol stack architecture for communicating data between the access terminal 204 and one or more network nodes of the wireless communication system 200 (e.g., the base station 202). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 3 is a block diagram illustrating an example of a protocol stack architecture which may be implemented by an access terminal 204. Referring to FIGS. 2 and 3, the protocol stack architecture for the access terminal 204 is shown to generally include three layers: Layer 1 (L1), Layer 2 (L2), and Layer 3 (L3).

Layer 1 302 is the lowest layer and implements various physical layer signal processing functions. Layer 1 302 is also referred to herein as the physical layer 302. This physical layer 302 provides for the transmission and reception of radio signals between the access terminal 204 and a base station 202.

The data link layer, called layer 2 (or "the L2 layer") 304 is above the physical layer 302 and is responsible for delivery of signaling messages generated by Layer 3. The L2 layer 304 makes use of the services provided by the physical layer 302. The L2 layer 304 may include two sublayers: the Medium Access Control (MAC) sublayer 306, and the Link Access Control (LAC) sublayer 308.

The MAC sublayer 306 is the lower sublayer of the L2 layer 304. The MAC sublayer 306 implements the medium access protocol and is responsible for transport of higher layers' protocol data units using the services provided by the physical layer 302. The MAC sublayer 306 may manage the access of data from the higher layers to the shared air interface.

The LAC sublayer 308 is the upper sublayer of the L2 layer 304. The LAC sublayer 308 implements a data link protocol that provides for the correct transport and delivery of signaling messages generated at the layer 3. The LAC sublayer makes use of the services provided by the lower layers (e.g., layer 1 and the MAC sublayer).

Layer 3 310, which may also be referred to as the upper layer or the L3 layer, originates and terminates signaling messages according to the semantics and timing of the communication protocol between a base station 202 and an access terminal 204. The L3 layer 310 makes use of the services provided by the L2 layer. Information (both data and voice) messages are also passed through the L3 layer 310.

According to aspects of this disclosure, a number of firmware/software solutions may be used to mitigate victim's Rx desense at an AT 102. These solutions include: 1) force preamble detection; 2) effective SNR loss based DRC request; 3) MAC channel handling, 4) FERAM saturation based nulling mode selection; and 5) narrow band (NB) energy estimator based nulling mode selection. Each of these desense techniques will be described in more detail below.

Force Preamble Detection

Figure 4:
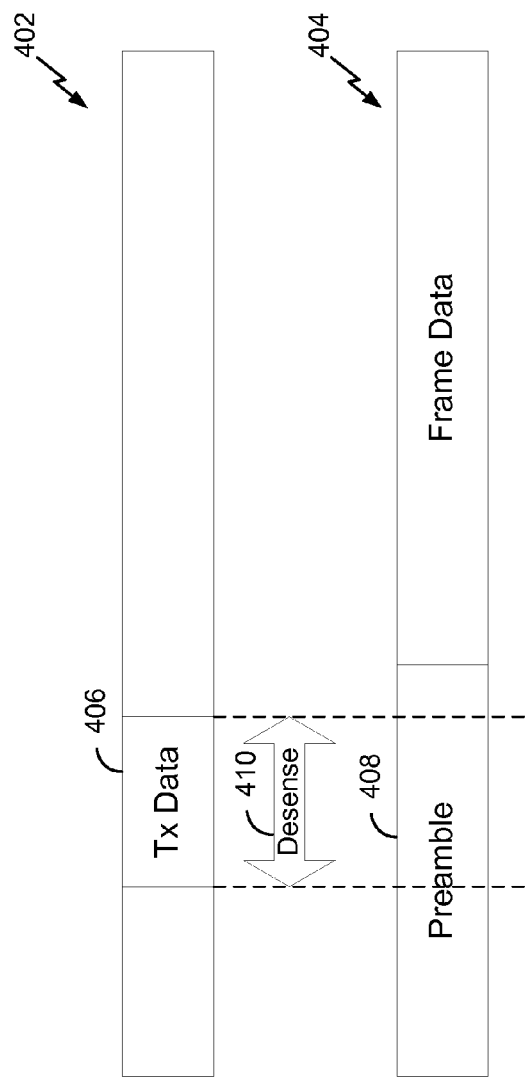
FIG. 4 is a conceptual diagram illustrating a GSM transmission causing desense on the preamble of an EV-DO reception.

FIG. 4 is a conceptual diagram illustrating a GSM transmission 402 causing desense on the preamble of an EV-DO reception 404. In FIG. 4, an AT 102 may transmit first data 406 (e.g., data 108) using GSM (aggressor's Tx) while the AT 102 simultaneously receives the preamble 408 of EV-DO data (e.g., data 112). Here, the transmission of the first data 406 overlaps at least partially with the reception of the preamble 408. Therefore, it may cause preamble mis-detection in the EV-DO reception 404. That is, if the preamble 408 is substantially desensed, the AT 102 may miss the preamble 408, and the corresponding packet is lost. According to aspects of the disclosure, since the time period 410 ("desense period") of the interfering GSM transmission 402 is known by the AT 102, the AT may force preamble detection to be positive during the desense period 410. The AT 102 will then attempt decoding of the slot corresponding to the force-detected preamble. If there is actually no preamble, this can be handled by generally known preamble false alarm handling operations in existing standards, and typical false alarm protection mechanism my be applied to handle this potential situation.

Figure 5:
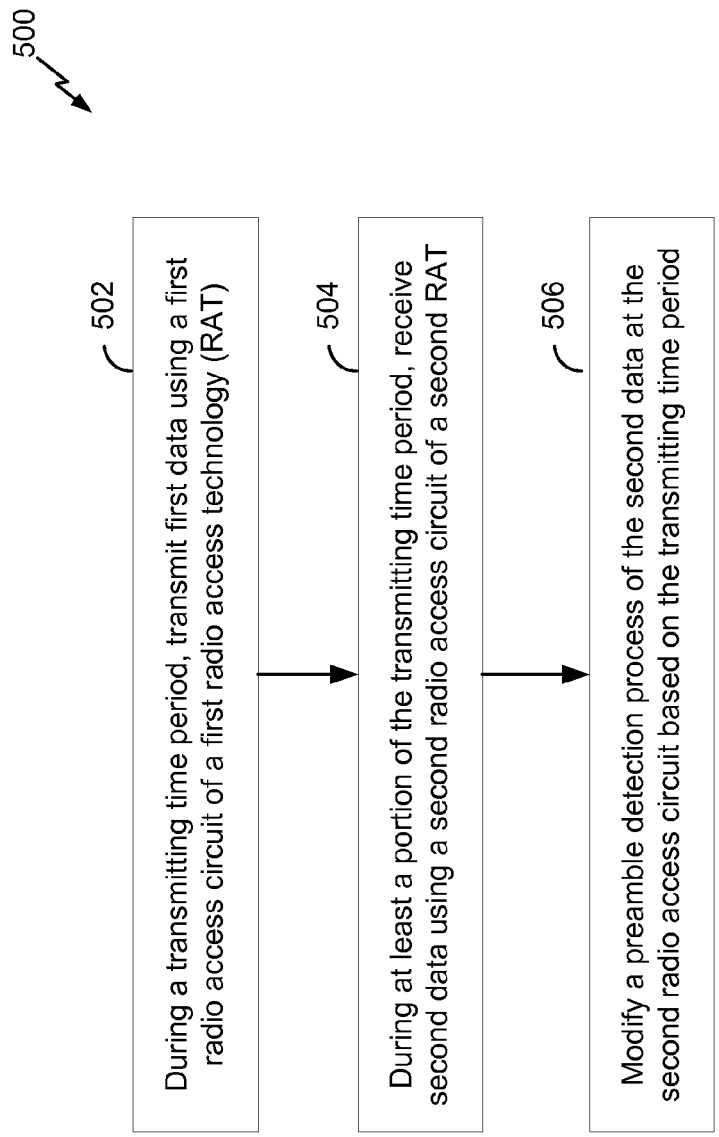
FIG. 5 is a diagram illustrating a forced preamble detection method for mitigating receiver desense at an access terminal according to some aspects of the disclosure.

FIG. 5 is a diagram illustrating a forced preamble detection method 500 for mitigating receiver desense during dual-active mode at a dual-SIM access terminal according to some aspects of the disclosure. The dual-SIM access terminal may be an AT 102. In block 502, during a transmitting time period (e.g., desense period 410 in FIG. 4), the AT 102 may transmit first data (e.g., data 406 in FIG. 4) using a first radio access circuit (e.g., circuit 110) of a first radio access technology (RAT) (e.g., GSM). In block 504, during at least a portion of the transmitting time period, the AT 102 may receive second data (e.g., data 404 in FIG. 4) using a second radio access circuit (e.g., circuit 114) of a second RAT (e.g., EV-DO). Here, the transmission of the first data may desense the reception of the second data. In block 506, the AT 102 may modify a preamble detection process of the second data at the second radio access circuit based on the transmitting time period.

Here, because the AT 102 knows the time period in which the aggressor's Tx transmission may cause desense on the victim's Rx preamble, the AT 102 can force preamble detection to be positive during this transmitting time period. If no preamble actually exists during the transmitting time period, the AT 102 may apply a suitable false preamble protection mechanism generally known in the art. In a preamble resolve mechanism at the AT 102, the forced preamble will always have the lowest priority to guarantee that true preambles will not be missed.

Effective SNR Loss Based DRC Request

In aspects of the disclosure, desense on the victim's Rx may be mitigated by reflecting the degree of desense in a Data Rate Control (DRC) request. In EV-DO, an AT 102 may request variable rates on the forward link using a DRC channel on the reverse link. In order to manage transmission rate of the forward traffic channel, the forward traffic channel MAC protocol (e.g., MAC 306 in FIG. 3) may operate in a variable rate state. In the variable rate state, the forward traffic channel transmits at a rate that can change in real time. In this case, the transmission rate is requested by the AT 102 using the DRC channel on the reverse link.

To mitigate desense on victim's Rx, the AT 102 may consider the additional signal-to-noise (SNR) loss that will be caused by aggressor's Tx transmission when choosing a DRC request. Given the known aggressor's Tx transmission timeline, the AT 102 may utilize a function that returns an estimated percentage of samples desensed for a given DRC request, and this percentage can be converted into an effective SNR loss. In a rate predictor of the AT 102, the AT may add the effective SNR loss to the predicted SNR to obtain an effective SNR, before comparing that to the thresholds. Each DRC rate may have its own threshold that is a function of SNR. Accordingly, the preference for long DRC or short DRC will naturally be reflected in the DRC request, and desense on the victim's Rx may be mitigated using the DRC request.

FIG. 6 is a diagram illustrating a DRC request based method 600 for mitigating receiver desense during dual-active mode at a dual-SIM access terminal according to some aspects of the disclosure. In block 602, an AT 102 determines a transmitting time period 604 for transmitting first data 606 using a first radio access circuit of a first RAT (e.g., GSM). During the transmitting time period 604, the AT 102 may simultaneously receive second data 610 using a second radio access circuit (e.g., circuit 114 in FIG. 1) of a second RAT (e.g., EV-DO). Therefore, the transmission of first data 606 may desense at least some of the second data 610. In block 608, the AT 102 estimates a percentage of the second data 610 to be interfered (e.g., desensed) by the transmission of the first data 606 during the transmitting time period 604. Both transmitting start/end time of first radio access circuit and receiving start/end time of second radio access circuit are known so that the percentage of interference may be estimated. Here, the second data 610 is going to be received using the second RAT. In block 612, the AT 102 determines an effective signal-to-noise ratio (SNR) based on the estimated percentage in block 608. For example, the effective SNR is a sum of a predicted SNR and an effective SNR loss that is based on the estimated percentage. In block 614, the AT 102 sends a DRC request based on the effective SNR using the second radio access circuit. The AT 102 may send the DRC request once every DRCLength number of slots. The DRC request has a 4-bit value (DRC value) that is sent on the DRC channel once every specified number of slots. The number of slots over which a single DRC value is sent is specified by the parameter DRCLength.

Figure 7:
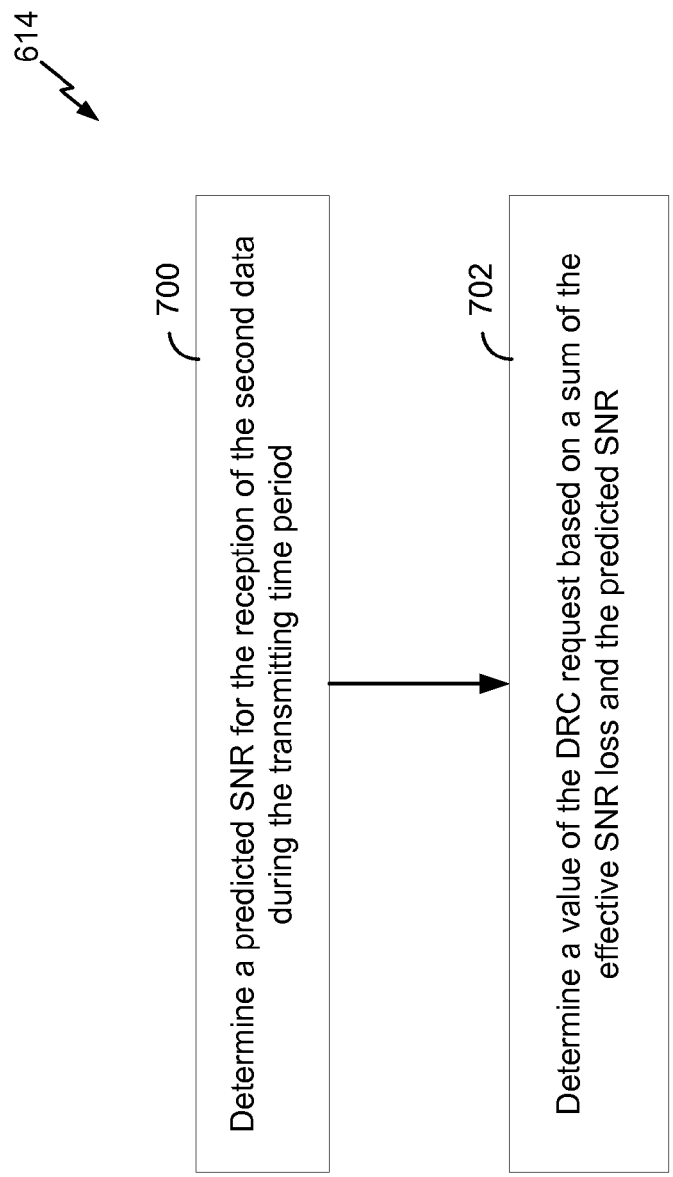
FIG. 7 is a diagram illustrating further detail on the desense method of FIG. 6 according to some aspects of the disclosure.
Figure 8:
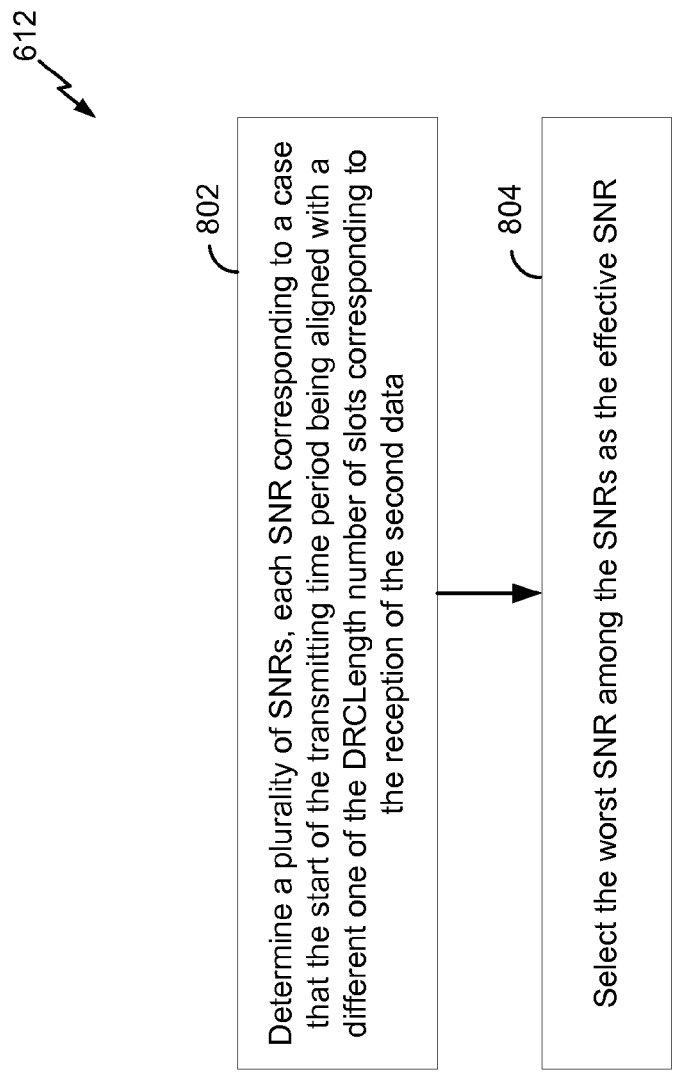
FIG. 8 is a diagram illustrating further detail on the desense method of FIG. 6 according to some aspects of the disclosure.

FIG. 7 is a diagram illustrating further detail of the desense method 600. In one aspect, the block 614 may further include blocks 700 and 702. In block 700, the AT 102 determines a predicted SNR for the reception of the second data during the transmitting time period 604; and in block 702, the AT 102 determines a value of the DRC request based on a sum of the effective SNR loss and the predicted SNR. FIG. 8 is a diagram illustrating further detail of the desense method 600. In one aspect, the block 612 may include blocks 802 and 804. In block 802, the AT 102 may determine a plurality of SNRs for the reception of the second data 610. Each SNR corresponds to a case that the start of the transmitting time period 604 is aligned with a different one of the DRCLength number of slots corresponding to the reception of the second data 610. In block 804, the AT 102 selects the worst SNR among the SNRs as the effective SNR. Accordingly, the AT 102 may mitigate desense by considering the additional signal-to-noise (SNR) loss that will be caused by aggressor's Tx transmission when choosing a DRC request.

MAC Channel Handling

Figure 9:
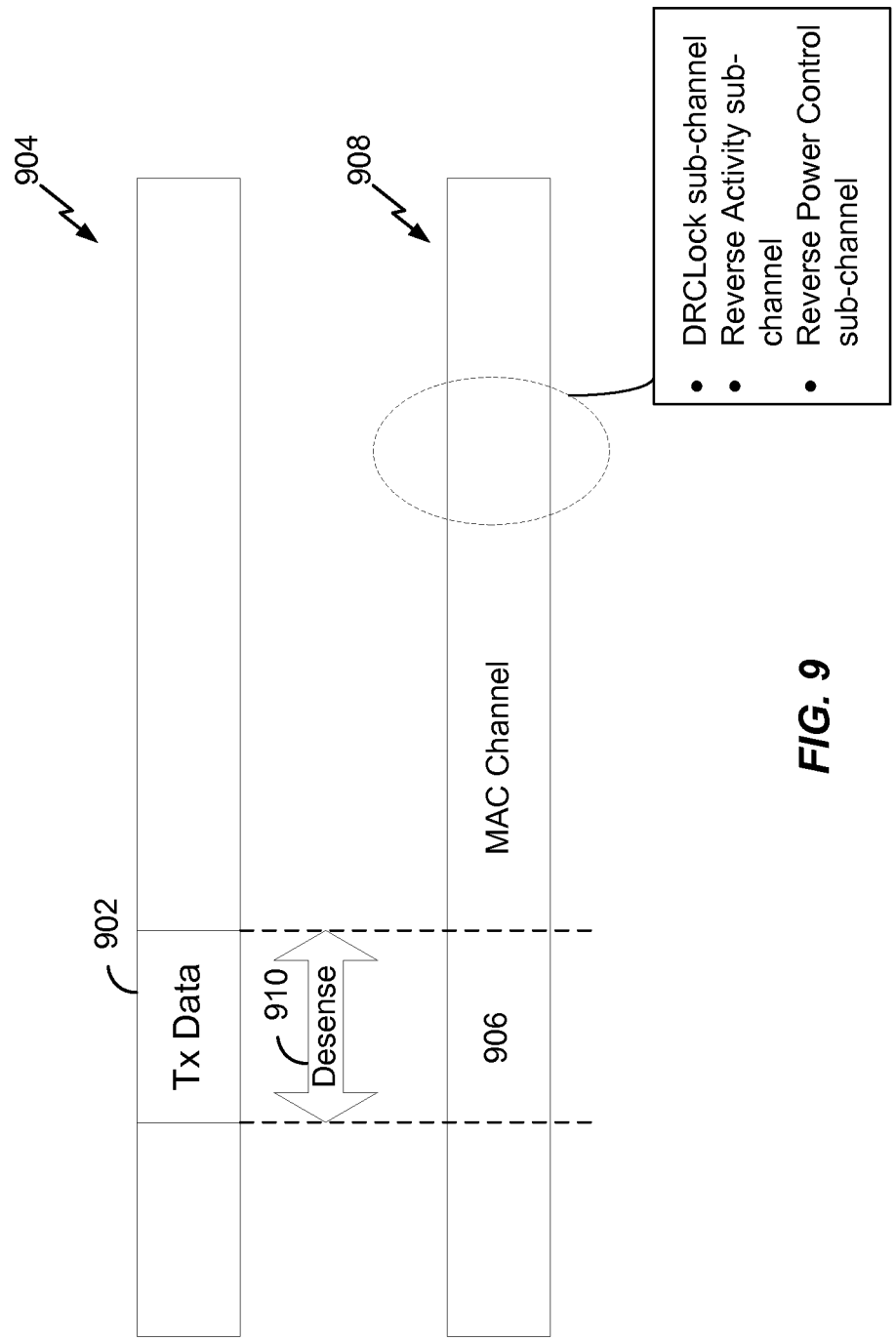
FIG. 9 is a conceptual diagram illustrating desense on a forward MAC channel due to an aggressor's Tx transmission.

In some aspects of the disclosure, an AT 102 may mitigate desense by removing or reducing the impact on corrupted MAC channel reception. For example, in an EV-DO system, different channels are used on the forward link such as the pilot channel, forward traffic channel/control channel, and MAC channel. The MAC channel contains the Reverse Activity sub-channel (RAC), Data Rate Control (DRC) Lock sub-channel, and Reverse Power Control (RPC) sub-channel. FIG. 9 is a diagram illustrating desense on a forward link MAC channel due to an aggressor's Tx transmission. In FIG. 9, an AT 102 may transmit first data 902 on a first channel 904 (aggressor's Tx) and simultaneously receives second data 906 data from a forward MAC channel 908. During a transmitting time period 910, the transmission of the first data 902 may desense the MAC channel 908. Because the AT 102 knows the aggressor's Tx transmitting time period (e.g., 910), the impacts due to corrupted MAC channel reception may be suspended or ignored during this period to mitigate desense.

The DRC Lock sub-channel indicates to the AT 102 whether the DRC information was correctly decoded at the network or not. A single bit is used per active AT. To mitigate the impact due to corrupted DRC Lock reception, the AT 102 may forego accumulating the corrupted portion of this sub-channel during known aggressor's Tx transmitting time periods (e.g., 910).

The RAC indicates if the reverse link (RL) loading is too high, in which case the AT 102 reduces its data rates on the RL. The RAC carries reverse activity bits (RAB). The number of slots over which a single RAB is transmitted is specified by the parameter RABLength. To mitigate the impact due to corrupted RAC reception, the AT 102 may forego updating RAB filter during known aggressor's Tx transmission time periods (e.g., 910).

The RPC sub-channel is used to power control ATs' reverse link transmission. The RPC sub-channel is used to send power control bits for that purpose. The quality of the reverse link depends on the quality of the RPC channel. To ensure the quality of the reverse link, the system needs to make sure that the RPC channel is received correctly by an AT 102. To mitigate the impact due to corrupted RPC channel reception, the AT 102 may set the RL power control decision to hold during known aggressor's Tx transmission time periods (e.g., 910).

Figure 10:
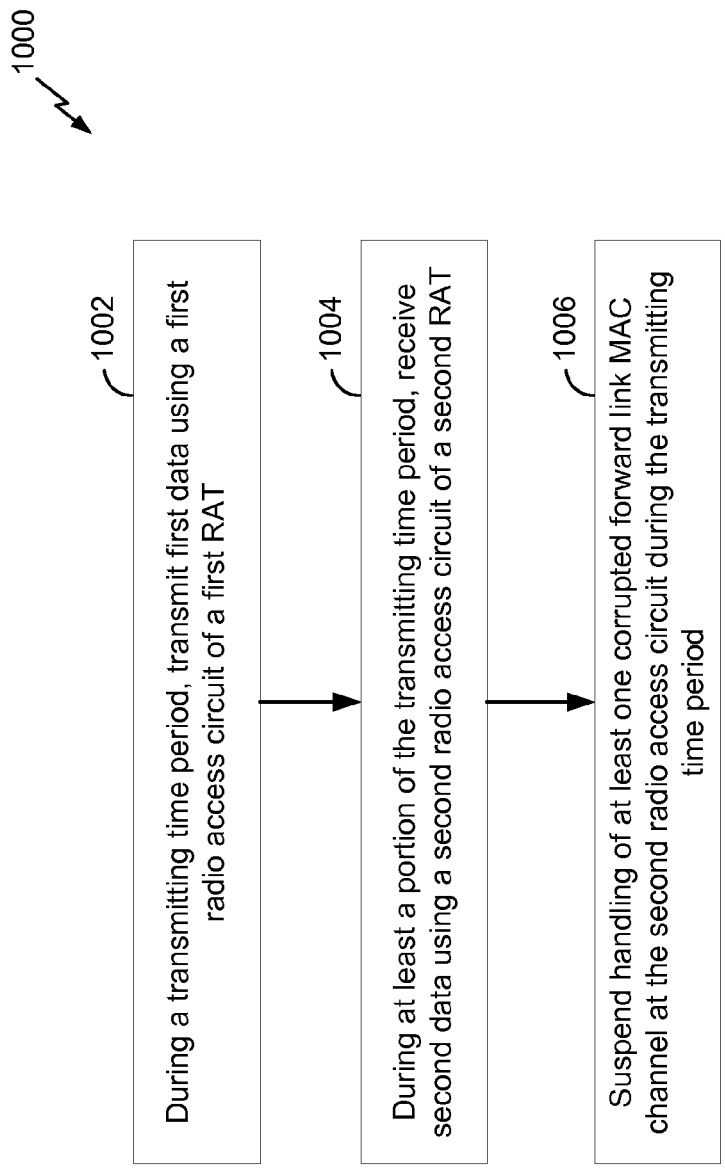
FIG. 10 is a diagram illustrating a MAC channel based method for mitigating receiver desense at an access terminal according to some aspects of the disclosure.

FIG. 10 is a diagram illustrating a MAC channel based method 1000 for mitigating receiver desense during dual-active mode at a dual-SIM access terminal according to some aspects of the disclosure. In block 1002, an AT 102, during a transmitting time period 910, transmits first data using a first radio access circuit (e.g., circuit 110) of a first RAT (e.g., GSM). In block 1004, the AT 102, during at least a portion of the transmitting time period 910, receives second data using a second radio access circuit (e.g., circuit 114) of a second RAT (e.g., EV-DO). In block 1006, the AT 102, suspends handling of at least one corrupted forward link MAC channel (e.g., RAC, DRC Lock sub-channel, and RPC sub-channel) at the second radio access circuit during the transmitting time period 910. In some aspects, during the transmitting period 910, the AT 102 may forgo accumulating a corrupted portion of a DRCLock channel at the second radio access circuit, forgo updating a Reverse Activity channel filter, or suspend reverse link power control decision.

FERAM Saturation and Narrow Band Energy Estimator Based Nulling

In aspects of the disclosure, desense may be mitigated by nulling (e.g., resetting to zeros) data samples (e.g., EV-DO data) received during a desense period. Given a known aggressor's Tx transmitting time period, nulling decision may be carried out differently for high desense level and low desense level. For low desense level, an AT 102 may prefer not nulling the data samples because the data may still contain valid information. For high desense level, the AT 102 my prefer nulling the data samples because the samples are dominated by noise due to desense. Two nulling mode selection approaches are illustrated below as nonlimiting examples. However, the present disclosure is not limited to the disclosed nulling approaches. Other suitable nulling approaches may be used.

Figure 11:
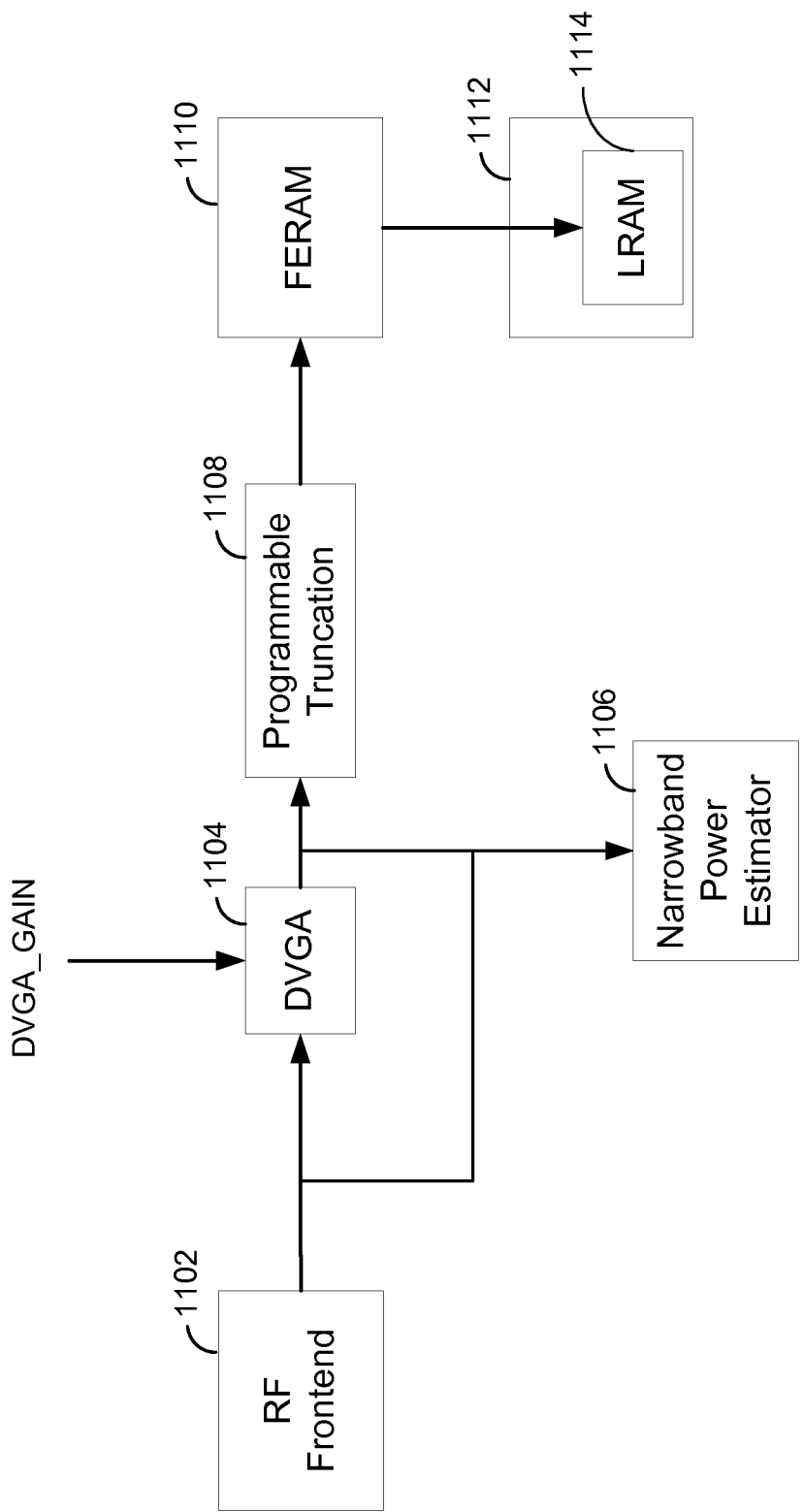
FIG. 11 is a functional block diagram illustrating portions of an access terminal for performing nulling in accordance with some aspects of the disclosure.

FIG. 11 is a functional block diagram illustrating portions of an AT 102 that may be utilized to perform nulling in accordance with some aspects of the disclosure. The AT 102 includes an RF frontend 1102 that may be included in or connected to the second radio circuit 114. The RF frontend 1102 may be used to receive the second data 112 and output a signal corresponding to the received data. The RF frontend 1102 is operatively connected to an input of a digital variable gain amplifier (DVGA) 1104 and a narrow band (NB) power estimator 1106. The gain of the DVGA 1104 may be controlled by a DVGA_GAIN control signal. An output of the DVGA 1104 is operatively connected to the NB power estimator 1106 and a programmable truncation unit 1108. An output of the programmable truncation unit 1108 is operatively connected to a Ferroelectric RAM (FERAM) 1110. Data samples corresponding to the received second data 112 are stored in the FERAM 1110. In addition, the AT 102 may include a vector processing engine (VPE) 1112 that includes a local random access memory (LRAM) 1114 that can receive data from the FERAM 1110.

Figure 12:
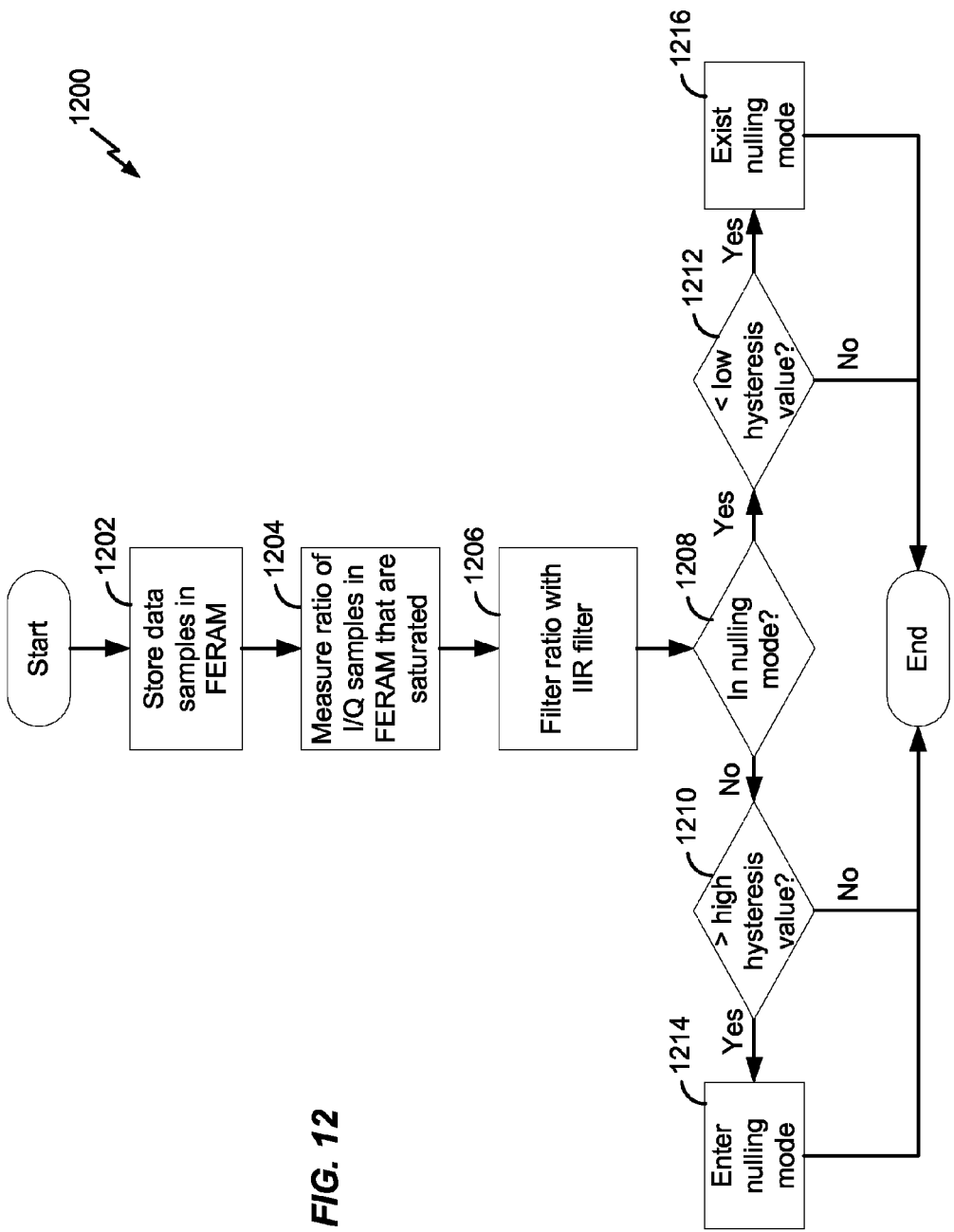
FIG. 12 is a flow chart illustrating a ferroelectric RAM (FERAM) saturation based nulling algorithm in accordance with some aspects of the disclosure.

FIG. 12 is a flow chart illustrating an FERAM saturation based nulling algorithm 1200 in accordance with some aspects of the disclosure. In step 1202, an AT 102 stores received victim's data samples (e.g., EV-DO samples) in an FERAM 1110. In step 1204, for each aggressor's transmission (e.g., a GSM burst), the AT 102 measures the ratio of FERAM I/O samples that are saturated. Nulling may be decided based on the saturation ratio for the I/Q samples stored at the FERAM 1110. In step 1206, the ratio may be filtered with a 1-tap infinite impulse response (IIR) filter (e.g., alpha may be 1/128). The saturation ratio may be compared to a threshold value to decide whether or not to null the data. In one aspect, the threshold value may be set at 20% saturation to trigger nulling. In some aspects, hysteresis may be applied for mode switching. For example, a high hysteresis value (e.g., 0.3) and a low hysteresis value (e.g., 0.2) may be used for deciding mode switching. However, other suitable upper and lower hysteresis values may be used.

In step 1208, the AT 102 continues to step 1210 if the AT 102 is currently not in nulling mode, or to step 1212 if the AT 102 is currently in nulling mode. In step 1210, when the filtered output exceeds the high hysteresis value, the AT 102 enters nulling mode in step 1214. In nulling mode, the AT 102 may null the samples in the FERAM 1110. In step 1212, when the filtered output is below the low hysteresis value, the AT 102 exits nulling mode in step 1216.

Figure 13:
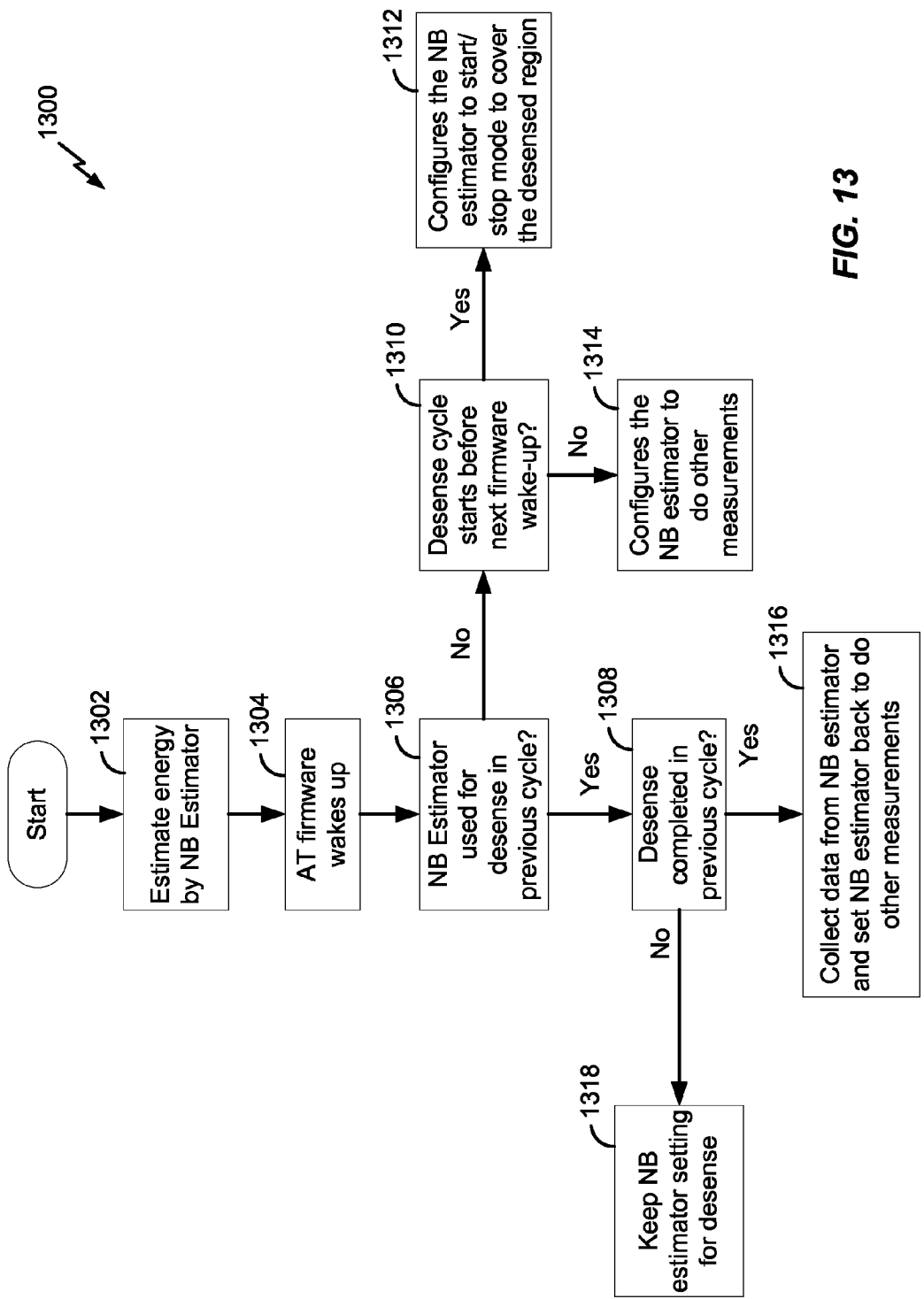
FIG. 13 is a flow chart illustrating a narrow band (NB) energy estimator based nulling algorithm in accordance with some aspects of the disclosure.

FIG. 13 is a flow chart illustrating a narrow band energy estimator based nulling algorithm 1300 in accordance with some aspects of the disclosure. In step 1302, an AT 102 may use the feed-forward mode of an NB energy estimator 1106 to estimate energy of victim's data samples before a DVGA 1104. The energy estimator 1106 may be configured to start accumulating when a desense period starts and accumulates until the desense period ends, based on the known aggressor's transmitting timeline. The timing may be controlled by firmware or software at the AT 102. Since the AT 102 knows the timing of the desense time period, the AT 102 may compute the average energy per sample during this time period. In an example where the aggressor's Tx is GSM and the victim's Rx is EV-DO, one value may be computed per GSM uplink slot. In EV-DO, nulling may be performed by resetting the data samples in front end random access memory (FERAM) or local random access memory (LRAM). The value may be filtered with a single tap IIR filter with a reasonably long time constant (e.g., 100 ms). The filtered output is compared with a suitable threshold to decide the mode (i.e., nulling or no nulling). A hysteresis may be used to avoid a ping-pong effect.

In step 1304, the firmware of the AT 102 may wake up every half slot. In step 1306, it is determined whether or not the NB energy estimator 1106 was used for desense measurement in the previous cycle. The algorithm 1300 moves to step 1308 if the NB energy estimator 1106 was used for desense measurement in the previous cycle, or moves to step 1310 if not used for desense measurement in the previous cycle. In step 1310, the firmware may use the GSM uplink timeline information to check if a desense cycle will start before the next time the firmware wakes up. The algorithm 1300 moves to step 1312 or step 1314 based on the decision in step 1310.

In step 1312, the firmware determined that a desense cycle will start before the next time the firmware wakes up. Therefore, the firmware configures the NB energy estimator 1106 to a start/stop mode to cover the desensed time period. During this time, the NB energy estimator 1106 will not be used for other measurements (e.g., R×AGC related measurements). In step 1314, the firmware determined that a desense cycle will not start before the next time the firmware wakes up. Therefore, the firmware may configure the NB energy estimator 1106 to do other measurements.

In step 1308, the firmware determined that the NB energy estimator 1106 was used for desense measurement in the previous wakeup cycle. If desense measurement was completed in the previous cycle, the algorithm 1300 moves to step 1316; if not, to step 1318. In step 1316, the firmware collects the measured data from the NB energy estimator 1106 and set it back to do other measurements. The measured data may be used to compute average energy per data sample, filtered, and decide whether or not to null. In step 1318, the firmware will not change the setting of the NB energy estimator 1106. In this cycle, the firmware continues to use the NB energy estimator 1106 for desense measurement.

Various desense apparatuses, methods and algorithms have been described above for purpose of illustration and not limitation. Furthermore, the desense methods may be applied separately or in various combinations.

Figure 14:
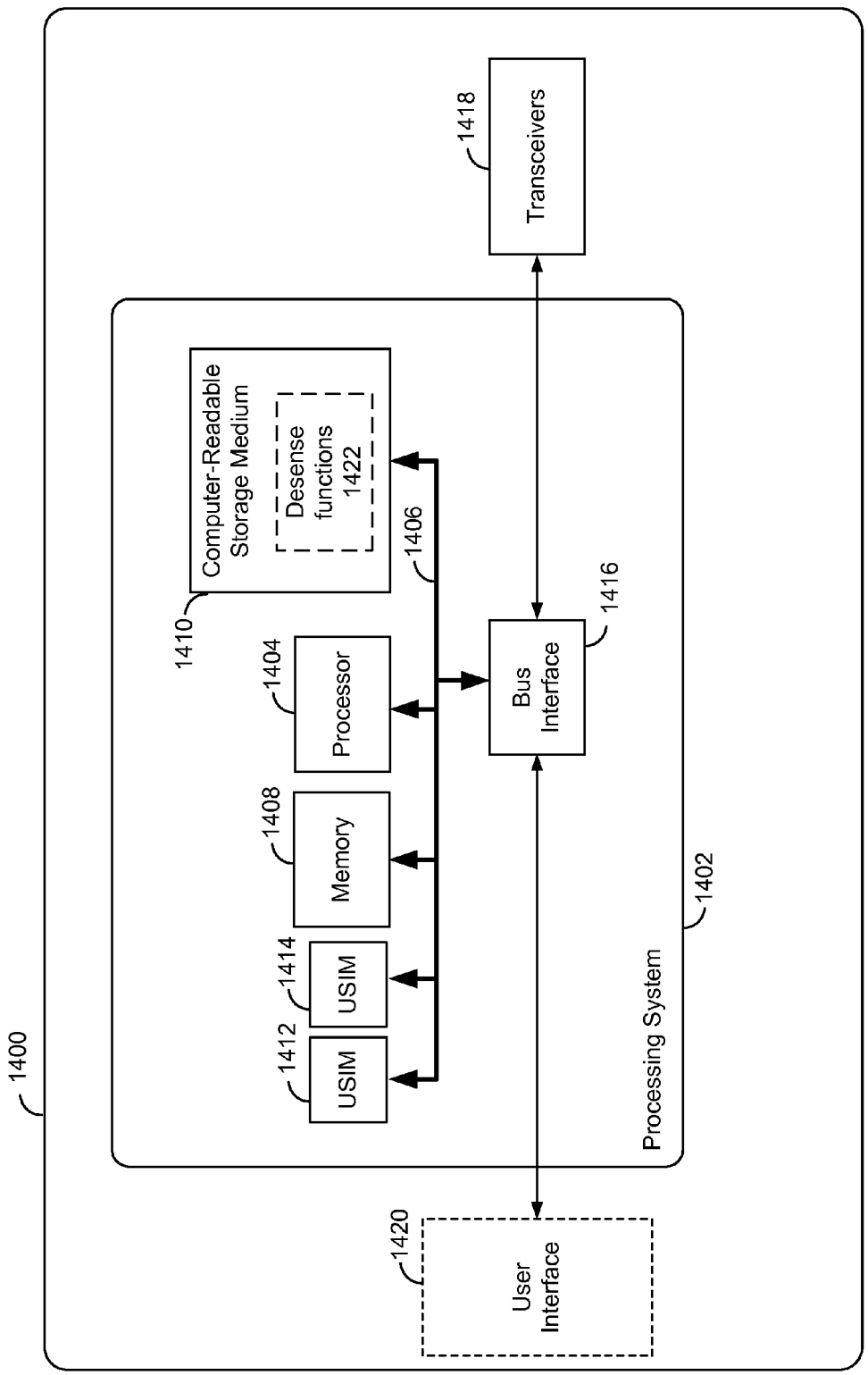
FIG. 14 is a block diagram illustrating an example of a hardware implementation for an access terminal employing a processing system according to some aspects of the disclosure.

FIG. 14 is a block diagram illustrating an example of a hardware implementation for an access terminal 1400 (e.g., an AT 102) employing a processing system 1402. In accordance with various aspects of the disclosure, an element, or any portion of an element, or any combination of elements may be implemented with a processing system 1402 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 1402 may be implemented with a bus architecture, represented generally by a bus 1406. The bus 1406 may include any number of interconnecting buses and bridges depending on the specific application of the processing system 1402 and the overall design constraints. The bus 1406 links together various circuits or components including one or more processors (represented generally by the processor 1404), a memory 1408, computer-readable media (represented generally by the computer-readable medium 1410), and one or more USIMs (e.g., dual USIMs 1412 and 1414). The bus 1406 may also link various other circuits such as timing sources, peripherals, voltage regulators, and power management circuits, which are well known in the art, and therefore, will not be described any further. A bus interface 1416 provides an interface between the bus 1406 and a number of transceivers 1418 (e.g., two or more transceivers). Each transceiver 1418 provides a means for communicating with various other apparatus over a transmission medium.

In some examples of a dual-SIM device such as the illustrated AT 102 including two USIMs 1412 and 1414, each USIM may be utilized by a corresponding one of the transceiver 1418 to access different RATs (e.g., GSM and EV-DO). For example, one transceiver 1418 may be used to access the first wireless communications network 104, and another transceiver 1418 may be used to access the second wireless communications network 106.

Depending upon the nature of the apparatus, a user interface 1420 (e.g., keypad, display, speaker, microphone, joystick) may also be provided. The processor 1404 is responsible for managing the bus 1406 and general processing, including the execution of software stored on the computer-readable medium 1410. The software, when executed by the processor 1404, causes the processing system 1402 to perform various desense functions 1422 including those described above for any particular apparatus. The computer-readable medium 1410 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1410. The computer-readable medium 1410 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1410 may reside in the processing system 1402, external to the processing system 1402, or distributed across multiple entities including the processing system 1402. The computer-readable medium 1410 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 15:
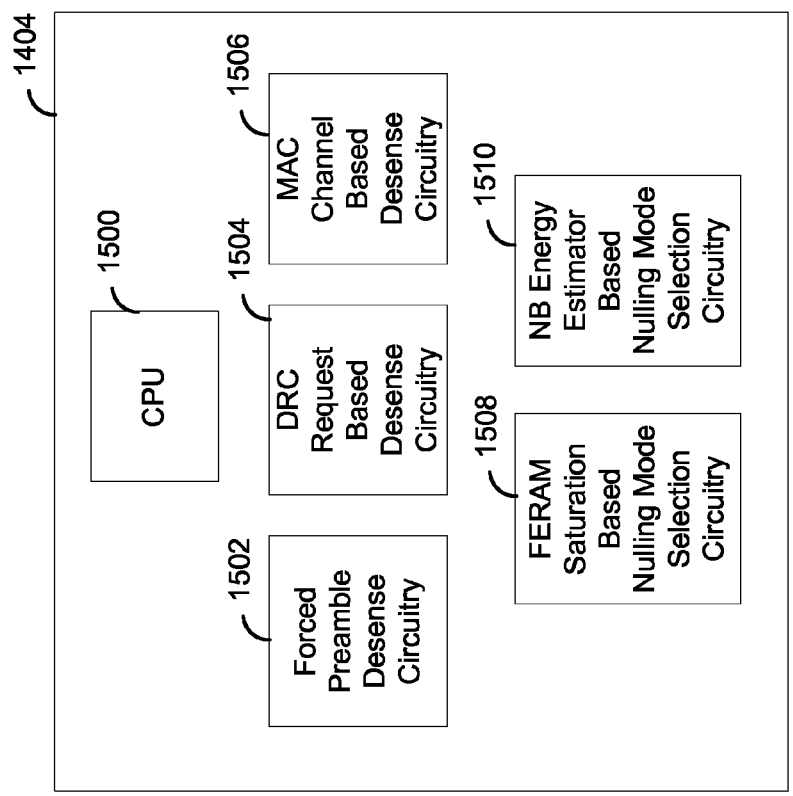
FIG. 15 is a conceptual diagram illustrating a number of functional blocks of a processor in the access terminal of FIG. 14 in accordance with some aspects of the disclosure.

FIG. 15 is a conceptual diagram illustrating some functional blocks of the processor 1404 in accordance with some aspects of the disclosure. The processor 1404 may include a central processing unit (CPU) 1500, a forced preamble desense circuitry 1502, a DRC request based desense circuitry 1504, a MAC channel based desense circuitry 1506, a FERAM saturation based nulling mode selection circuitry 1508, and an NB energy estimator based nulling mode selection circuitry 1510. The CPU 1500 may provide the means for performing various general processing tasks. The forced preamble desense circuitry 1502 may provide the means for performing the forced preamble detection method of FIG. 5 for mitigating receiver desense at an access terminal (e.g., an AT 102). The DRC request based desense circuitry 1504 may provide the means for performing the DRC requested based method of FIGS. 6-8 for mitigating receiver desense at an access terminal. The MAC channel based desense circuitry 1506 may provide the means for performing the MAC channel based method of FIG. 10 for mitigating receiver desense at an access terminal. The FERAM saturation based nulling mode selection circuitry 1508 may provide the means for performing the FERAM saturation based nulling algorithm of FIG. 12. The NB energy estimator based nulling mode selection circuitry 1510 may provide the means for performing the NB energy estimator based nulling algorithm of FIG. 13.

In one configuration, an access terminal (e.g., AT 102) for wireless communication includes: during a transmitting time period, means for transmitting first data (e.g., data 108) using a first radio access circuit (e.g., circuit 110); during at least a portion of the transmitting time period, means for receiving second data (e.g., data 114) using a second radio access circuit (e.g., circuit 114); and means for selectively modifying a preamble detection process at the second radio access circuit based on the received second data.

In another configuration, an access terminal (e.g., AT 102) includes: means for determining a transmitting time period for transmitting first data (e.g., data 108) using a first radio access circuit (e.g., circuit 110); means for estimating a percentage of second data (e.g., data 112) to be interfered by the transmission of the first data during the transmitting time period, the second data being to be received using a second radio access circuit (e.g., circuit 114); means for determining an effective SNR based on the estimated percentage; and means for sending a DRC request based on the effective SNR using the second radio access circuit.

In another configuration, an access terminal (e.g., AT 102) includes: during a transmitting time period, means for transmitting first data (e.g., data 108) using a first radio access circuit (e.g., circuit 110); during at least a portion of the transmitting time period, means for receiving second data (e.g., data 112) using a second radio access circuit (e.g., circuit 114); and means for suspending handling of at least one corrupted forward link MAC channel at the second radio access circuit during the transmitting time period.

In another configuration, an access terminal (e.g., AT 102) includes: during a transmitting time period, means for transmitting first data (e.g., data 108) using a first radio access circuit (e.g., circuit 110); during at least a portion of the transmitting time period, means for receiving second data (e.g., data 112) using a second radio access circuit (e.g., circuit 114); means for storing the second data in a memory; means for determining a desense value indicative of a degree of desense on the reception of the second data caused by the transmission of the first data; and means for selectively nulling the second data in the memory based on the desense value.

In one aspect, the aforementioned means may be the processor(s) 1404 configured to perform the functions recited by the aforementioned means. In another aspect, the aforementioned means may be a module or any apparatus configured to perform the functions recited by the aforementioned means.

Several aspects of a telecommunications system have been presented with reference to GSM and EV-DO systems. As those skilled in the art will readily appreciate, various aspects described throughout this disclosure may be extended to other telecommunication systems, network architectures and communication standards. By way of example, various aspects may be extended to systems employing UMTS (FDD, TDD), Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of mitigating receiver desense during dual-active mode at a dual-SIM access terminal, comprising:
   during a transmitting time period, transmitting first data using a first radio access circuit of a first radio access technology (RAT);
   during at least a portion of the transmitting time period, receiving second data using a second radio access circuit of a second RAT; and
   modifying a preamble detection process of the second data at the second radio access circuit based on the transmitting time,
   wherein the modifying the preamble detection process comprises forcing preamble detection to be positive during the transmitting time period, and wherein the modifying the preamble detection process further comprises if no preamble exists, applying false preamble protection mechanism.

2. The method of claim 1, wherein the first RAT is Global System for Mobile Communications (GSM), and the second RAT is Evolution for Data Optimized (EV-DO).

3. A dual-SIM access terminal capable of mitigating receiver desense during dual-active mode, comprising:
a first radio access circuit of a first radio access technology (RAT); a second radio access circuit of a second RAT;
during a transmitting time period, means for transmitting first data using the first radio access circuit;
during at least a portion of the transmitting time period, means for receiving second data using the second radio access circuit; and
means for modifying a preamble detection process at the second radio access circuit based on the transmitting time period,
wherein the modified preamble detection process comprises forcing preamble detection to be positive during the transmitting time period, and
wherein the modifying the preamble detection process further comprises if no preamble exists, applying false preamble protection mechanism.

4. A computer program product, comprising a non-transitory computer-readable storage medium comprising code for causing a dual-SIM access terminal capable of mitigating receiver desense during dual-active mode, to:
during a transmitting time period, transmit first data using a first radio access circuit of a first radio access technology (RAT);
during at least a portion of the transmitting time period, receive second data using a second radio access circuit of a second RAT; and
modify a preamble detection process at the second radio access circuit based on the transmitting time period,
wherein the modified preamble detection process comprises forcing preamble detection to be positive during the transmitting time period,
wherein the modifying the preamble detection process further comprises if no preamble exists, applying false preamble protection mechanism.

5. A dual-SIM access terminal capable of mitigating receiver desense during dual-active mode, comprising:
at least one processor;
a first radio access circuit of a first radio access technology (RAT) coupled to the at least one processor;
a second radio access circuit of a second RAT coupled to the at least one processor;
a memory coupled to the at least one processor,
wherein the at least one processor is configured to:
during a transmitting time period, transmit first data using the first radio access circuit;
during at least a portion of the transmitting time period, receive second data using the second radio access circuit; and
modify a preamble detection process at the second radio access circuit based on the transmitting time period
wherein the modified preamble detection process comprises forcing preamble detection to be positive during the transmitting time period,
wherein the at least one processor is further configured to if no preamble exists, apply false preamble protection mechanism.

6. The dual-SIM access terminal of claim 5, wherein the first RAT is Global System for Mobile Communications (GSM), and the second RAT is Evolution for Data Optimized (EV-DO).

* * * * *